July 25, 1933.　　　S. B. LAVICK　　　1,919,661
COLLAR SUPPORT
Filed July 18, 1930
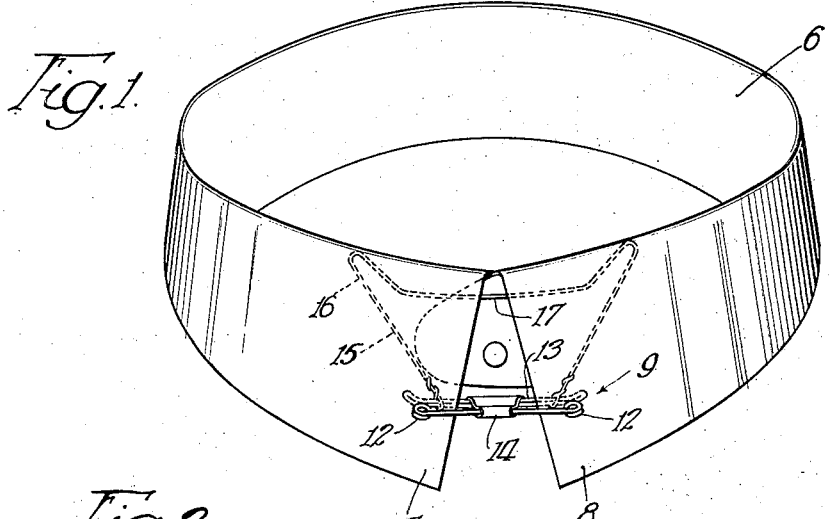
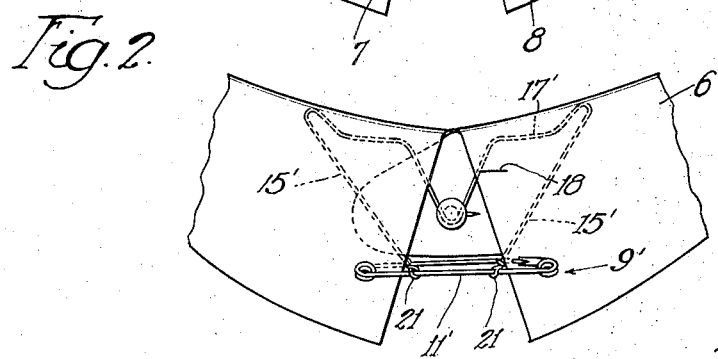
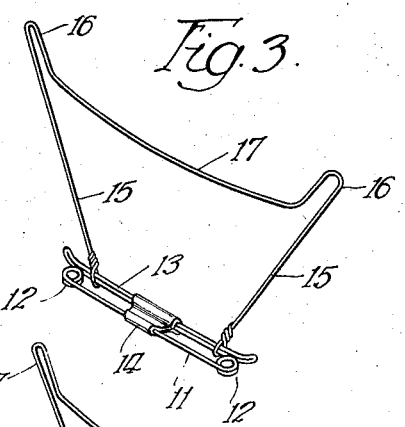
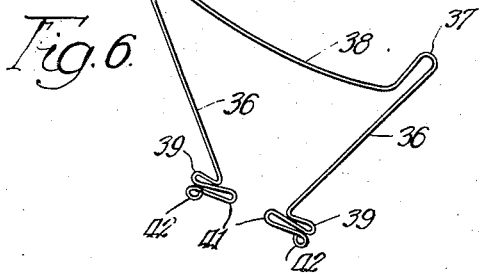
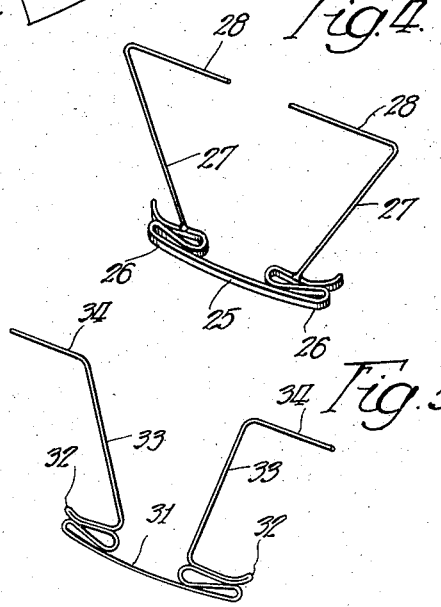
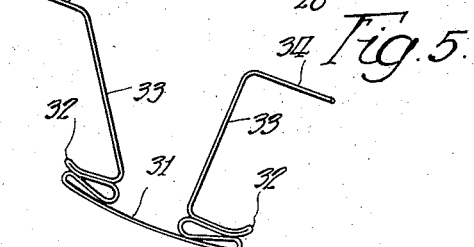
Inventor
Samuel B. Lavick
By George E. Mueller Atty Patented July 25, 1933

1,919,661

UNITED STATES PATENT OFFICE

SAMUEL B. LAVICK, OF CHICAGO, ILLINOIS

COLLAR SUPPORT

Application filed July 18, 1930. Serial No. 468,840.

My invention relates to a collar support, and more particularly to a support or brace for retaining the front portion of a collar in position.

In wearing a collar of the type known as soft collars, the natural stiffness of the material or the slight starching thereof is insufficient to retain the collar in correct form, particularly in front where the neck rests at times upon the upper edge of the collar.

I have found that by providing a thin metallic support secured to the bar or collar pin this difficulty may be completely avoided.

An object of my invention is to provide a new and improved collar support.

A further object is to provide a support for cooperation with a collar pin to retain a collar in correct form.

A further object is to provide a device for keeping the collar neat and attractive in appearance.

Other objects and advantages will appear as the description proceeds.

Referring to the drawing:

Fig. 1 is a front elevational view showing the invention applied to a collar,

Fig. 2 is a similar fragmentary view showing a modified form of the invention,

Fig. 3 is a perspective view of a device embodying the invention,

Fig. 4 is a perspective view of another modification,

Fig. 5 is a perspective view of still another modification, and,

Fig. 6 is a perspective view of a further modification of the device.

Fig. 1 illustrates a collar having a neckband 6 and lapels 7 and 8 folded down over the neckband. In order to hold the lapels together in predetermined spaced relation, a collar or bar pin 9 is provided having a front bar 11 provided with a loop or eye 12 at either end, and a double rear bar 13. The front and rear bars are held together by a center piece 14, and the lapels of the collar are adapted to be clamped between loops 12 and the ends of the double bar 13. Connected to the rear double bar 13 are a pair of upwardly extending arms 15 which extend between the lapels and the neckband, and have loops 16 at their upper ends which rest in the crease between the neckband and the lapel. The inner side of each loop extends downwardly substantially parallel with arm 15, and the planes of the loops are at an angle to the plane of the arms and cross the planes of the arms between the arms. This permits the loops to lie flat against the neckband when the collar is worn. The loops of the arms are connected by a forwardly bowed connecting portion 17. The recurved portion of the loops 16 bring the connecting portion downwardly a sufficient distance so that the connecting portion will be concealed by the tie.

The support is preferably made of a fine resilient wire having sufficient stiffness to retain the collar in position, and when made of a bright colored wire, such as a polished silver color, it will be practically invisible against the light background of the collar, even though the tie sags slightly so as to expose the connecting portion of the support.

It has been found that the loops may be spaced quite far apart without permitting the portion of the collar immediately above the collar bottom from sagging. This spacing of the loops gives a wider range of support for the upper edge of the collar than if the loops were closely spaced.

Fig. 2 illustrates a slightly modified form of the invention in which the connecting portion 17' has a V-shaped portion 18 extending around the collar button to effectively conceal the connecting portion from view. In this modification the arms 15' are shown connected to the upper bar 11' of the collar pin 9'. This collar pin is of the safety pin type and is pierced through the lapels. It will be seen that with this type of pin it is advantageous to mount the arms of the support on the front bar of the pin, since otherwise it would be necessary to thread the pin through the eyes 21 in the ends of the arms after the pin is pierced through one of the lapels. Since the support is made of resilient material the ends of the arms carrying eyes 21 will be urged outwardly along front bar 11, and rest firmly against the edges of the lapels so as to be substantially out of sight.

While the collar support is preferably made of a fine wire, it will be understood that it may be stamped out of sheet metal or molded from any suitable material, and the support instead of being slidable on a bar of the pin, may be fixed thereto or made integral therewith in any suitable manner.

In Figure 4 is shown a collar pin consisting of a bar 25 having an S-shaped clasp 26 at either end for clasping the lapels of a collar and hold them in proper position. Extending upwardly from each clasp is an arm 27. These arms diverge from each other and have inwardly projecting portions 28 which rest in the crease between the neckband and lapels to support the collar in position. The arms 27 may be secured to the bar in any suitable manner as by welding them thereto or making them integral therewith. The arms 27 of this modification are completely concealed by the collar and the device has the appearance of consisting only of the bar pin 25 when applied to a collar.

Fig. 5 illustrates a modification somewhat similar to Fig. 4 and consists of a bar pin 31 having a double loop 32 at each end for clasping the lapels of a collar. Between the loops and extending upwardly from the second loop of each of the double loops is an arm 33 having an outwardly directed portion 34. The arms 33 diverge upwardly and the portions 34 lie in the crease between the neckband and lapels.

Fig. 6 illustrates a collar support which is similar to the embodiment shown in Figs. 1 and 3 in that it has upwardly extending arms 36 having loops 37 at their upper extremities which are connected by a connecting portion 38. The lower portion of arms 36 is provided with a loop 39 and a second loop 41 having an eye 42 at its end. The lapel of the collar is adapted to be clamped between loop 39 and eye 42. The support of this embodiment of the invention is preferably made of rather heavy metal and the arms 36 are resiliently urged into close proximity to each other. The device is applied by first positioning it so that the loops 37 rest in the crease between the lapels and neckband. The clasp at the lower extremity of each arm 36 is then secured to the lapel of the collar, and on account of the shape and resiliency of the support the lapels are urged toward each other to hold them in proper position. The effect of the use of this embodiment of the invention is very similar to the use of the device shown in Figs. 1 and 3, since it has the double function of preventing the upper edge of the collar from being pushed out of shape, and providing a support and retaining means for the lapels.

While I have described specific forms or embodiments of the invention it wil be understood that many changes and modifications may be made therein without departing from the spirit and scope of the invention, which is to be limited only in accordance with the appended claims.

What I claim is new and desire to protect by Letters Patent of the United States is:—

1. A device for supporting a collar comprising means for attachment to the lapels of a collar to retain them in predetermined position, a resilient support having arms slidably mounted on said means, said arms being resiliently urged against the edges of said lapels and extending upwardly under the lapels between the lapels and neckband, and a connecting portion connecting said arms.

2. A device for supporting a collar comprising means for attachment to the lapels of a collar, a support secured thereto having arms extending upwardly under the lapels and into the crease between the lapels and neckband, and a connecting portion extending underneath the collar button.

3. In a device for supporting a collar, a spring clip comprising a pair of resilient bars lying in the same horizontal plane, means intermediate the ends of said bars for holding them in a fixed relationship whereby the lapels of the collar may be gripped between the ends of said bars, a wire supporting frame secured adjacent the ends of the clip adapted for fitting under the lapels between the lapels and neckband, and co-operating with the clip to hold the lapels of the collar taut in a vertical direction.

4. In a device for supporting a collar, a spring clip comprising a pair of resilient bars lying in the same horizontal plane, a sleeve fitting over said bars intermediate the ends for securing the bars in a fixed relationship whereby the lapels of the collar may be gripped between the ends of said bars, a resilient wire supporting frame having arms carried by one of the bars adjacent the ends of the clip, said arms extending upwardly under the lapels and co-operating with the clip to hold the lapels of the collar taut in a vertical direction.

5. In a collar supporting device, a spring clip comprising forward and rearward positioned resilient bars lying in the same horizontal plane, and means intermediate the ends of said bars for securing them in fixed relationship whereby the lapels of the collar may be gripped between the ends of said bars, a resilient wire frame carried by the clip having arms co-operating with said clip to hold the lapels of the collar taut in a vertical direction.

SAMUEL B. LAVICK.